US009552203B1

United States Patent
Hanumantharayappa et al.

(10) Patent No.: US 9,552,203 B1
(45) Date of Patent: Jan. 24, 2017

(54) CONFIGURATION DEPENDENCY MANAGER FOR CONFIGURABLE APPLICATIONS

(71) Applicant: SuccessFactors, Inc., South San Francisco, CA (US)

(72) Inventors: Raghunandan Hanumantharayappa, Bangalore (IN); Aditya Tewari, Lucknow/Uttar Pradesh (IN); Anand Gokulchandran, Chennai/Tamil Nadu (IN)

(73) Assignee: SUCCESSFACTORS, INC., So. San Francisco, CA (US)

( * ) Notice: Subject to any disclaimer, the term of this patent is extended or adjusted under 35 U.S.C. 154(b) by 0 days.

(21) Appl. No.: 14/873,137

(22) Filed: Oct. 1, 2015

(51) Int. Cl.
G06F 9/44 (2006.01)
G06F 9/445 (2006.01)

(52) U.S. Cl.
CPC . *G06F 8/71* (2013.01); *G06F 8/33* (2013.01); *G06F 9/44589* (2013.01)

(58) Field of Classification Search
CPC ............ F06F 8/71; G06F 8/33; G06F 9/44589
USPC .......................................... 717/111, 121, 126
See application file for complete search history.

(56) References Cited

U.S. PATENT DOCUMENTS

| 8,321,921 B1* | 11/2012 | Ahmed | G06F 21/00 726/5 |
| 8,751,460 B1* | 6/2014 | Annapragada | G06F 17/30545 707/684 |
| 2009/0089128 A1* | 4/2009 | Tkatch | G06Q 10/06 719/330 |
| 2011/0289509 A1* | 11/2011 | Kothari | G06F 8/60 718/106 |
| 2013/0198718 A1* | 8/2013 | Kunze | G06F 8/61 717/121 |

OTHER PUBLICATIONS

Wang et al., "A Dependency-aware Hierarchical Service Model for SaaS and Cloud Services", 2011.*
Lizhen et al., "Customization Modeling based on Metagraph for Multi-Tenant Applications", 2010.*
Truyen et al., "Context-oriented Programming for Customizable SaaS Applications", 2011.*
Schroeter, "Towards Generating Multi-Tenant Applications", 2011.*

* cited by examiner

*Primary Examiner* — Phillip H Nguyen
(74) *Attorney, Agent, or Firm* — Fountainhead Law Group P.C.

(57) ABSTRACT

In one embodiment, during runtime use of a configurable application that is used by multiple service requesters, a configuration dependency manager is integrated in the configurable application to check a set of features for one of the service requesters. The method receives a service requester configuration for the set of features. A configuration dependency manager determines a set of dependencies for the set of features that have been configured by the service requester configuration and determines a developer's configuration for a plurality of features for the configurable application. Then, the configuration dependency manager analyzes the set of dependencies with corresponding dependencies in the developer's configuration to determine when an issue exists with the service requester configuration and provides a visualization of the set of features based on the analyzing the set of dependencies, wherein the issue is shown on the visualization.

20 Claims, 13 Drawing Sheets

```
402
    <module id="MODULE_ID" description="Module_Description">
404   <config-group id="ID_OF_GROUP_OF_CONFIGURATIONS" />
      <feature id="FEATURE_OF_MODULE" description="FEATURE_DESCTIPTION">
406     <config-group id="ID_OF_GROUP_OF_CONFIGURATIONS" />
408   </feature>
    </module>
```

FIG. 4A

```
410
    <config-group id="ID_OF_GROUP_OF_CONFIGURATIONS">
      <reference id="CONFIG_ID_1" />
      <reference id="CONFIG_ID_2" />
      <reference id="CONFIG_ID_3" />   412
      <reference id="CONFIG_ID_4" />
      <reference id="CONFIG_ID_5" />
    </config-group>
```

FIG. 4B

```
420 ─┐
422 ─── <table id="CONFIG_ID" name="TABLE_NAME"
           success="SUCCESS_MESSAGE"
424 ─────failure="FAILURE_MESSAGE">
           <column name="COLUMN_NAME" type="COLUMN_TYPE">PROPERTY_key</column>
           <column name="COLUMN_NAME" type="COLUMN_TYPE">PROPERTY_VALUE</column>
         </table>

⎧ <network id="CONFIG_ID" url="location_of_resource_to_accessed_over_network"
426-1   ⎨   success="SUCCESS_MESSAGE"
        ⎩   failure="FAILURE_MESSAGE"/>

⎧ <runtime-option id="CONFIG_ID" key="RUNTIME_OPTION_KEY"
426-2   ⎨   expected="RUNTIME_OPTION_EXPECTED_VALUE"
        ⎨   success="SUCCESS_MESSAGE"
        ⎩   failure="FAILURE_MESSAGE"/>

⎧ <file-entry id="CONFIG_ID" file="FILE_NAME" path="FILE_PATH"
426-3   ⎨   key="EXPECTED_FILE_ENTRY"
        ⎨   success="SUCCESS_MESSAGE"
        ⎩   failure="FAILURE_MESSAGE"/>
```

FIG. 4C

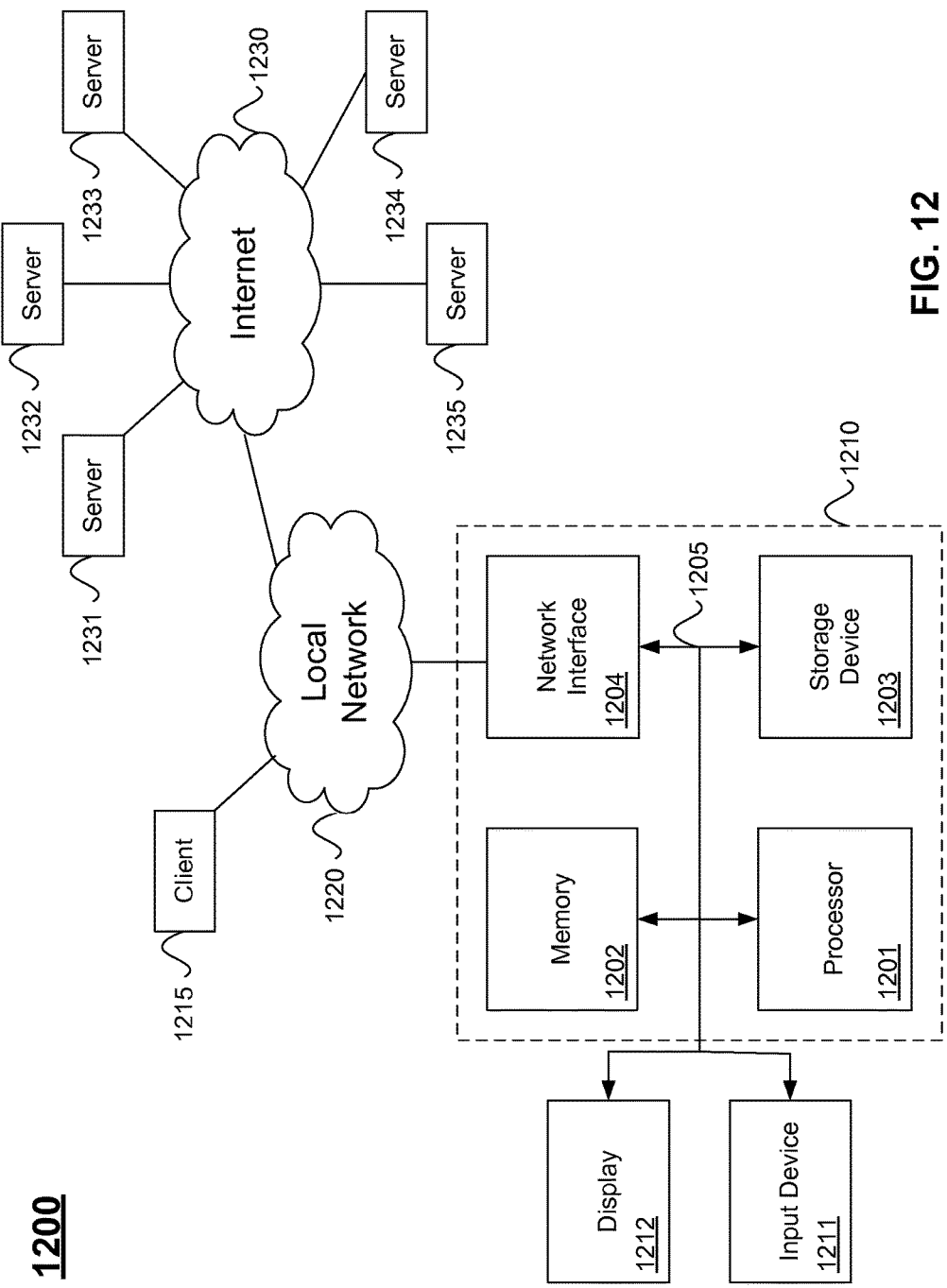

CONFIGURATION DEPENDENCY MANAGER FOR CONFIGURABLE APPLICATIONS

BACKGROUND

In a multi-tenant enterprise software-as-a-service (SAAS) product, multiple service requesters share an instance of the product. That is, the product provider may run a single instance of the product on a server that can be used by multiple service requesters. However, each service requester's data may be separated from other service requesters' data. The product provider may attempt to provide features desired by all service requesters. However, service requesters may desire a tailor-made and highly-customized version of the product that feels/looks like a personalized product that solves each service requester's unique problems.

To address the above customization issues, the product provider may include configurable features that service requesters can configure manually. Typically, an administrator or professional services for the service requester perform the feature configuration. This is often at a cost to the service requester. Also, many times the configuration may not be correct, which results in the feature not working in the product and application downtime. To fix any configuration issues, it is often difficult to pinpoint the problem. Typically, an engineering team needs to be contacted, which consumes engineering hours that could be used for other purposes.

SUMMARY

In one embodiment, during runtime use of a configurable application that is used by multiple service requesters, a configuration dependency manager is integrated in the configurable application to check a set of features for one of the service requesters. The method receives a service requester configuration for the set of features of the configurable application. The service requester configuration being set by the service requester. A configuration dependency manager determines a set of dependencies for the set of features that have been configured by the service requester configuration and determines a developer's configuration for a plurality of features for the configurable application. The developer's configuration including dependencies for each of the plurality of features in a pre-defined format. Then, the configuration dependency manager analyzes the set of dependencies with corresponding dependencies in the developer's configuration to determine when an issue exists with the service requester configuration and provides a visualization of the set of features based on the analyzing the set of dependencies, wherein the issue is shown on the visualization.

In one embodiment, a non-transitory computer-readable storage medium contains instructions, that when executed, control a computer system to be configured for: during runtime use of a configurable application that is used by multiple service requesters, using a configuration dependency manager integrated in the configurable application to check a set of features for one of the service requesters by performing: receiving, by the configuration dependency manager, a service requester configuration for the set of features of the configurable application, the service requester configuration being set by the service requester; determining, by the configuration dependency manager, a set of dependencies for the set of features that have been configured by the service requester configuration; determining, by the configuration dependency manager, a developer's configuration for a plurality of features for the configurable application, the developer's configuration including dependencies for each of the plurality of features in a pre-defined format; analyzing, by the configuration dependency manager, the set of dependencies with corresponding dependencies in the developer's configuration to determine when an issue exists with the service requester configuration; and providing, by the configuration dependency manager, a visualization of the set of features based on the analyzing the set of dependencies, wherein the issue is shown on the visualization.

In one embodiment, an apparatus includes: one or more computer processors; and a non-transitory computer-readable storage medium comprising instructions, that when executed, control the one or more computer processors to be configured for: during runtime use of a configurable application that is used by multiple service requesters, using a configuration dependency manager integrated in the configurable application to check a set of features for one of the service requesters by performing: receiving, by the configuration dependency manager, a service requester configuration for the set of features of the configurable application, the service requester configuration being set by the service requester; determining, by the configuration dependency manager, a set of dependencies for the set of features that have been configured by the service requester configuration; determining, by the configuration dependency manager, a developer's configuration for a plurality of features for the configurable application, the developer's configuration including dependencies for each of the plurality of features in a pre-defined format; analyzing, by the configuration dependency manager, the set of dependencies with corresponding dependencies in the developer's configuration to determine when an issue exists with the service requester configuration; and providing, by the configuration dependency manager, a visualization of the set of features based on the analyzing the set of dependencies, wherein the issue is shown on the visualization.

The following detailed description and accompanying drawings provide a better understanding of the nature and advantages of particular embodiments.

BRIEF DESCRIPTION OF THE DRAWINGS

FIG. 4A depicts a module configuration according to one embodiment.

FIG. 4B depicts an example of a pre-defined structured data format for a configuration group according to one embodiment.

FIG. 4C shows an example of a configuration according to one embodiment.

FIG. 12 illustrates hardware of a special purpose computing machine configured with the configuration dependency manager according to one embodiment.

DETAILED DESCRIPTION

Described herein are techniques for a configuration dependency manager for a configurable application. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a configuration dependency manager that can automatically check a feature's configuration, such as the feature's relationship/dependencies, during runtime of an application. The configuration dependency manager can then provide a visualization with an impact analysis of the feature configuration. If there are any issues with the configuration, the configuration dependency manager can provide a suggested fix. Also, the configuration dependency manager can disable the feature. Further, the configuration dependency manager can send notifications to users based on any issues with the feature configuration.

During the product and feature development, a developer for the company that is offering the product can capture the features' configuration and the features' relationships and dependencies in a pre-defined structured data format. The capturing of these dependencies during development will allow for the runtime analysis of feature configuration. During the runtime usage of the product by one of the service requesters, the configuration dependency manager uses the structured data captured during the development to analyze a feature's service requester configuration. The configuration dependency manager compares the service requester's configuration of a feature with the structured data to provide a visualization of the analysis of the features of the product. The visualization may also depict the health of each feature, and also describe any issues related to the feature's configuration.

Figure 1:
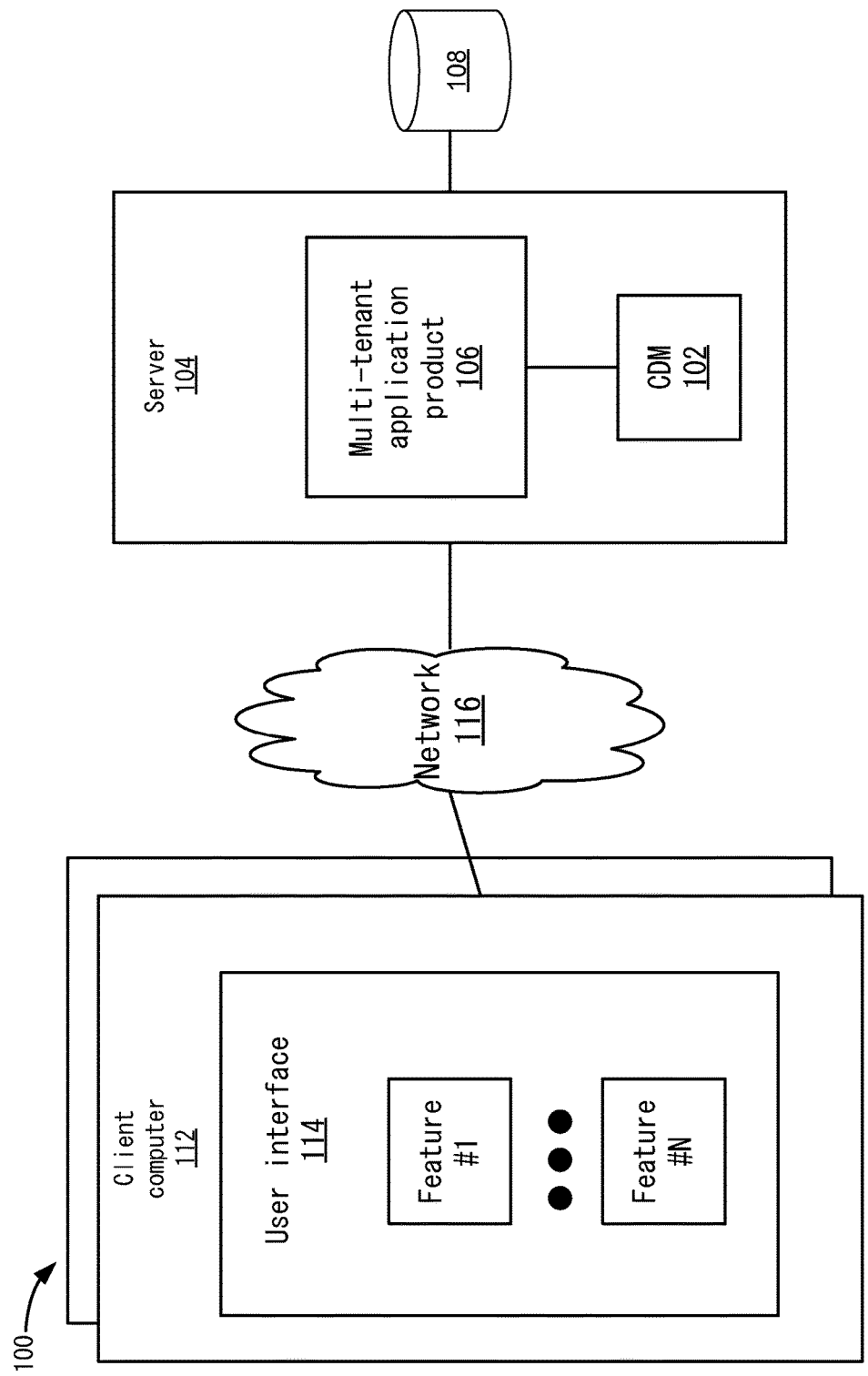
FIG. 1 depicts a simplified system for the configuration dependency manager (CDM) according to one embodiment.

FIG. 1 depicts a simplified system 100 for the configuration dependency manager (CDM) 102 according to one embodiment. System 100 includes a server 104 that is running a multi-tenant application product 106, such as an enterprise multi-tenant software-as-a-service (SAAS) product. In other embodiments, application product 106 may not be a multitenant application, but rather an application that can be configured by a service requester. A multi-tenant architecture hosts multiple service requesters and provides the service requesters the ability to customize their product. This high customization support means there cannot be a one-size-fits-all approach to identify and fix configuration issues as each client may face different kinds of errors. At the same time, there are several shared resources (such as servers) amongst these multi-tenant service requesters and any failure in one of these resources may impact all the service requesters using that resource. This means identifying a root cause of such failures and also analyzing the impact on the service requester's specific use of the multi-tenant application is important. Moreover, configurations in an enterprise multi-tenant product tend to overlap across different features increasing the likelihood of multiple features failing if there is a configuration error. This dependency needs to be captured in order to understand the severity of any configuration issue that arises. Using configuration dependency manager 102 helps the runtime operation of multi-tenant application product 106 by analyzing feature dependencies. In the following, one service requester may be discussed, but it will be understood that configuration dependency manager 102 performs the analysis for multiple service requesters that are using multi-tenant application product 106.

In one embodiment, multiple service requesters may access application product 106 via client computers 112. Each service requester may configure the application product 106 differently and be a separate and different entity (e.g., independent companies). Each client computer 112 may include a user interface 114 that connects to server 104 via a network 116, such as the Internet. Multi-tenant application product 106 may be associated with a database system 108 that separates each service requester's data for the product. Thus, different service requesters may securely use the same application that resides on server 104 in application product 106.

In user interface 114, service requesters may customize various features #1-#N. The customization process may include many steps that configure dependencies for the feature. The dependencies may be settings or parameters that are needed for the feature to operate correctly.

When a service requester customizes a feature, configuration dependency manager 102 receives the configuration and can analyze the dependencies of the configuration to determine any issues. If any issues are found, configuration dependency manager 102 may output the issues, notify users, and/or attempt to fix the issues. Further, as will be discussed in more detail below, configuration dependency manager 102 may provide a visualization of multiple features in product 106 and indicate the health of each feature based on the analysis. Configuration dependency manager 102 can also provide suggestions on how to fix the issue or disable the issue.

Figure 2:
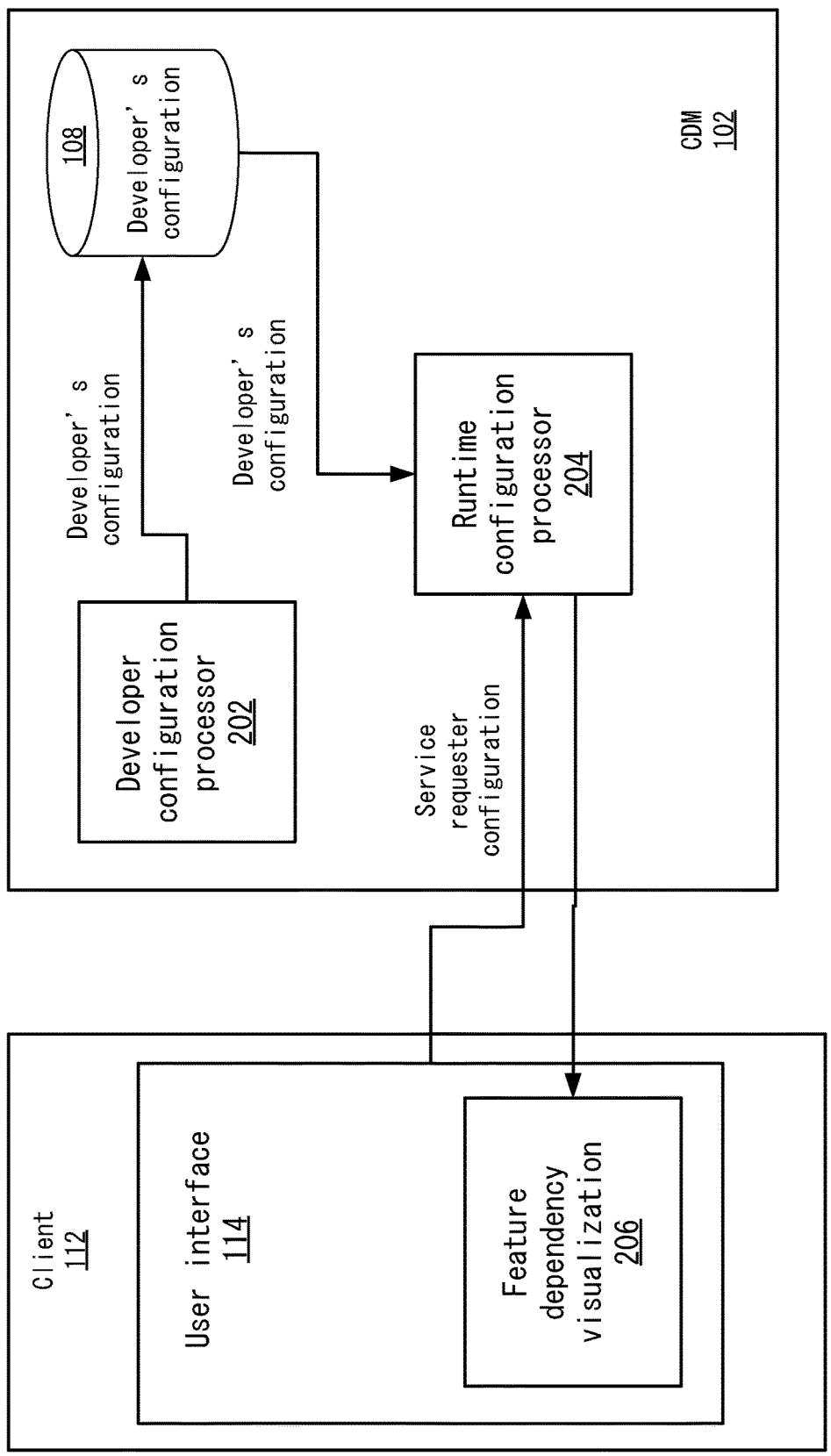
FIG. 2 depicts a more detailed example of using the configuration dependency manager according to one embodiment.

FIG. 2 depicts a more detailed example of using configuration dependency manager 102 according to one embodiment. Configuration dependency manager 102 may operate in a development phase and a runtime phase. During the development phase, a developer configuration processor 202 may be used by a developer to input a feature configuration that includes the feature's dependencies (e.g., relationships) in a pre-defined structured format. The dependencies may define parameters that need to be configured for the features to operate correctly in application product 106.

While developing the product, a developer may follow a pre-defined structured format, such as an extensible markup language (XML) structure, to define the features and the dependencies of the features. Developer configuration processor 202 then stores the developer's configuration in database 108 for later use during runtime. Having the structured data format being defined saves time for the developer. Also, having the developer input the structured data format for features during development also saves time because the developer is creating the feature configurations for the application product 106 at the time. Particular embodiments may require that the feature's dependencies be defined in the pre-defined structured data format before completion of the application product 106 for release to service requesters or at least before a respective release of a feature for service requester use. This ensures that configuration dependency manager 102 can be used.

During runtime, runtime configuration processor 204 receives a service requester configuration. Runtime configuration processor 204 is situated on server 104 so it can check the runtime configuration of application product 106. For example, configuration dependency manager 102 is integrated into multi-tenant application product 106 to allow configuration dependency manager 102 access to client configuration data and also runtime data that can be used to check feature dependencies. Runtime configuration processor 204 can thus access the service requester configuration and check the service requester configuration with the developer's configuration. For example, the during development phase, the developer specifies the dependencies (including the category the dependency belongs to, the place where the data for the dependency is stored, the dependency's expected value) for a given feature to work correctly, configuration dependency manager 102 looks for this information in the service requester's system at runtime and compares with the developer configuration for evaluating if the feature is configured correctly and is working. Then, depending on the analysis, runtime configuration processor 204 outputs a feature dependency visualization 206 of the configuration. Visualization 206 may start with top level various modules. The modules may include certain business objects, such as recruiting, job requisition, candidate, job application, application programming interface (API), etc. Each module may include a number of features. To determine any issues, runtime configuration processor 204 may check the configuration of the modules and features. Depending on the status of each module and feature, runtime configuration processor 204 changes the visualization 206.

Once providing the visualization 206, a service requester may use visualization 206 to determine where the configuration problems are and also possibly to determine how to solve the configuration problems.

Figure 3:
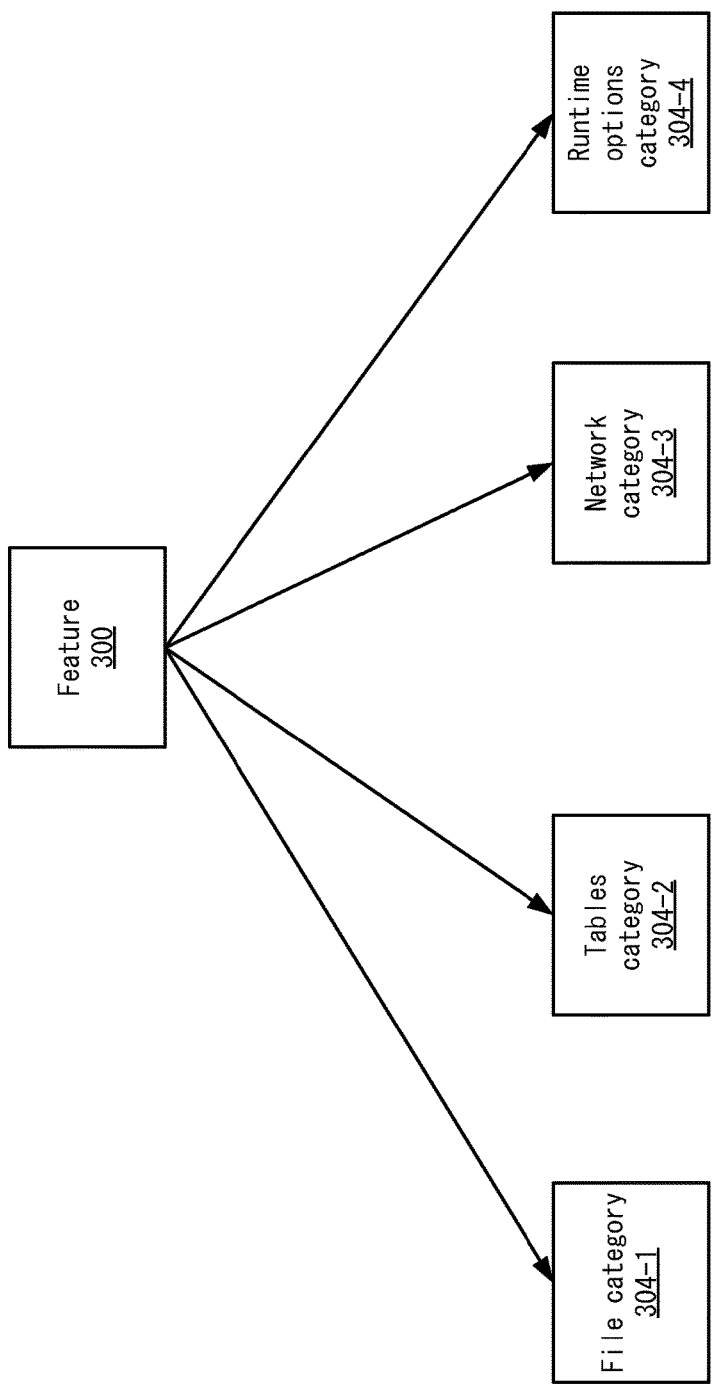
FIG. 3 depicts an example of the categories for dependencies of a feature according to one embodiment.

To configure a feature, dependencies need to be configured. FIG. 3 depicts an example of categories for dependencies of a feature 300 according to one embodiment. The dependencies may be categorized in different categories 304-1-304-4. However, other categories for the dependencies may be appreciated. The dependencies in each category may be captured via the pre-defined structure data format.

At 304-1, a file category may be properties stored in files needed for the feature to work. Examples of these dependencies include server information needed to perform specific tasks, properties required to access services provided by third parties, and the system configuration.

At 304-2, a tables category may be the data or configuration that is stored in the database 108 that are needed for the feature to work correctly. These dependencies include system configurations stored in the database 108 or feature configurations stored in the database 108.

At 304-3, the network category may be resources distributed over the network that should be available for the feature to work. Examples of these dependencies include checking if the servers configured for the feature are working as expected or not or a health check for partner systems accessible over the network for the feature.

At 304-4, the runtime options dependencies may be a server configuration and other runtime options required by the feature. Examples of these dependencies include checking the server runtime configuration that is needed for the feature.

The features may be configured under various modules where each module may include a number of features. FIGS. 4A-4C depict different pre-defined structured data formats for the application product's configuration according to one embodiment. FIG. 4A depicts a module configuration according to one embodiment. Modules may be top-level systems that represent an independent business solution for the service requester. For example, Recruiting, Performance Management, Goals, Succession Management are all examples of modules in multi-tenant application product 106. At 402, the module identifier is provided that uniquely identifies the module. The module may be a business object or part of a business hierarchy. At 404, the identifier for the group of configurations for the module is provided. The module configuration contains a configuration group on which the module configuration depends. A configuration group is an identifier to multiple configuration identifiers. For example, a module or feature may depend on multiple different dependencies. Using groups allows the different dependencies to be defined with a single group and also be reused. Each module developer/team working on a new feature for that module inputs entries to the above-mentioned configuration files clearly stating the dependencies for the new feature. The developers can make use of existing configuration groups if available to their feature entries. If new configurations are supported by the new feature, the developer needs to add the new configurations to a group to facilitate reusability.

Further, the module configuration contains the features included in the module and the configuration group the features depend on. For example, at 406, the identifier for a feature of the module is provided. Although one feature identifier is described, multiple feature identifiers may be provided in the module. Also, at 408, an identifier for the configuration group for the feature is provided. This identifier may identify a group of dependencies for the configuration group.

FIG. 4B depicts an example of a pre-defined structured data format for a configuration group according to one embodiment. The configuration group contains references to specific configuration identifiers. This allows for reuse of configurations. For example, instead of assigning five configuration identifiers to a feature or module, the group identifier can be assigned.

At 410, the configuration group ID is shown. This ID may uniquely identify the configuration group. At 412, reference identifiers for specific configurations #1-5 are provided. This means that this group includes these five configurations. Each configuration may include the specific dependencies. Other configuration groups may include different combinations of identifiers, such as configuration IDs 6-8 or configuration IDs 1, 2, 6, and 8.

FIG. 4C shows an example of a configuration according to one embodiment. This configuration may be for one configuration identifier as shown in FIG. 4A. At 420, the identifier for the configuration is provided. At 422, the success message may be defined and also at 424, the failure message is defined. The failure message may indication what information can be included in the failure message, such as the table information where the failure occurred including a column name, type, and property. The success or failure message will be output depending on the feature dependency analysis.

At 426-1-426-3, the dependencies are defined for the configuration. At 426-1, a network dependency is defined with a URL that is the location of the resource to be accessed over the network. Success and failure messages are also provided.

At 426-2, a runtime dependency is defined that shows a runtime option key and a runtime option expected value when retrieving a field value. The success and failure of this runtime option is also defined.

At 426-3, a file configuration dependency defines a file name, file path, and a key for the expected file entry for the dependency. A success and failure message is also defined.

If all of the above dependencies pass, then the configuration may pass. If one or more fail, then the configuration may fail. The input of this configuration during development time is important because the information can be easily determined by the developer. It would be harder to determine the dependencies if the configuration is determined during runtime because someone other than the developer may have to determine the dependencies, which may involve reviewing software code for multi-tenant application product 106. Further, the pre-defined structured data format allows the configuration to be input in a standardized format that configuration dependency manager 102 can later use. Using the format allows configuration dependency manager 102 to parse the format to determine the dependencies for the features.

Figure 5:
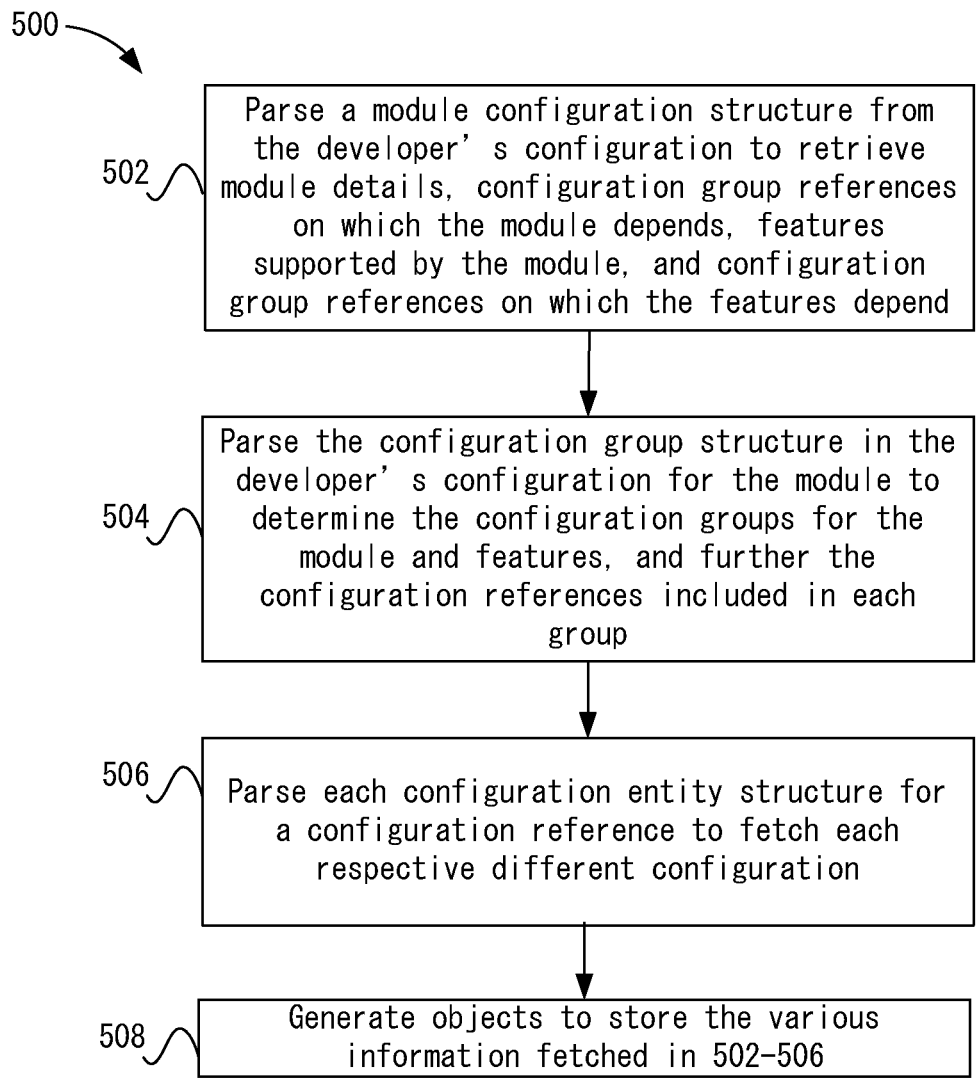
FIG. 5 depicts a simplified flowchart of a method for processing the developer's configuration for processing according to one embodiment.

Once the configuration is set, configuration dependency manager 102 needs to process the developer configuration so it can be evaluated based on the service requester's configuration during runtime. FIG. 5 depicts a simplified flowchart 500 of a method for processing the developer's configuration for processing according to one embodiment. At 502, configuration dependency manager 102 parses a module configuration structure from the developer's configuration to retrieve module details, configuration group references on which the module depends, features supported by the module, and configuration group references on which the features depend. As discussed above, the module may be a business object, such as recruiting.

At 504, configuration dependency manager 102 parses the configuration group structure in the developer's configuration for the module to determine the configuration groups for the module and features, and further the configuration references included in each group. This may determine all the configuration references for the module and features.

At 506, configuration dependency manager 102 parses each configuration entity structure for a configuration reference to fetch each respective different configuration. Each configuration entity may be associated with a configuration reference. The configuration entity may be in one the above-referenced categories, such as table, file, network, and runtime options. These are the specific dependencies.

At 508, configuration dependency manager 102 generates objects to store the various information fetched in 502-506. Configuration dependency manager 102 knows the pre-defined structured data format and can parse the structured data to determine the feature configuration. The preparation of the objects allows configuration dependency manager 102 to evaluate the service requester's configuration at runtime.

Figure 6:
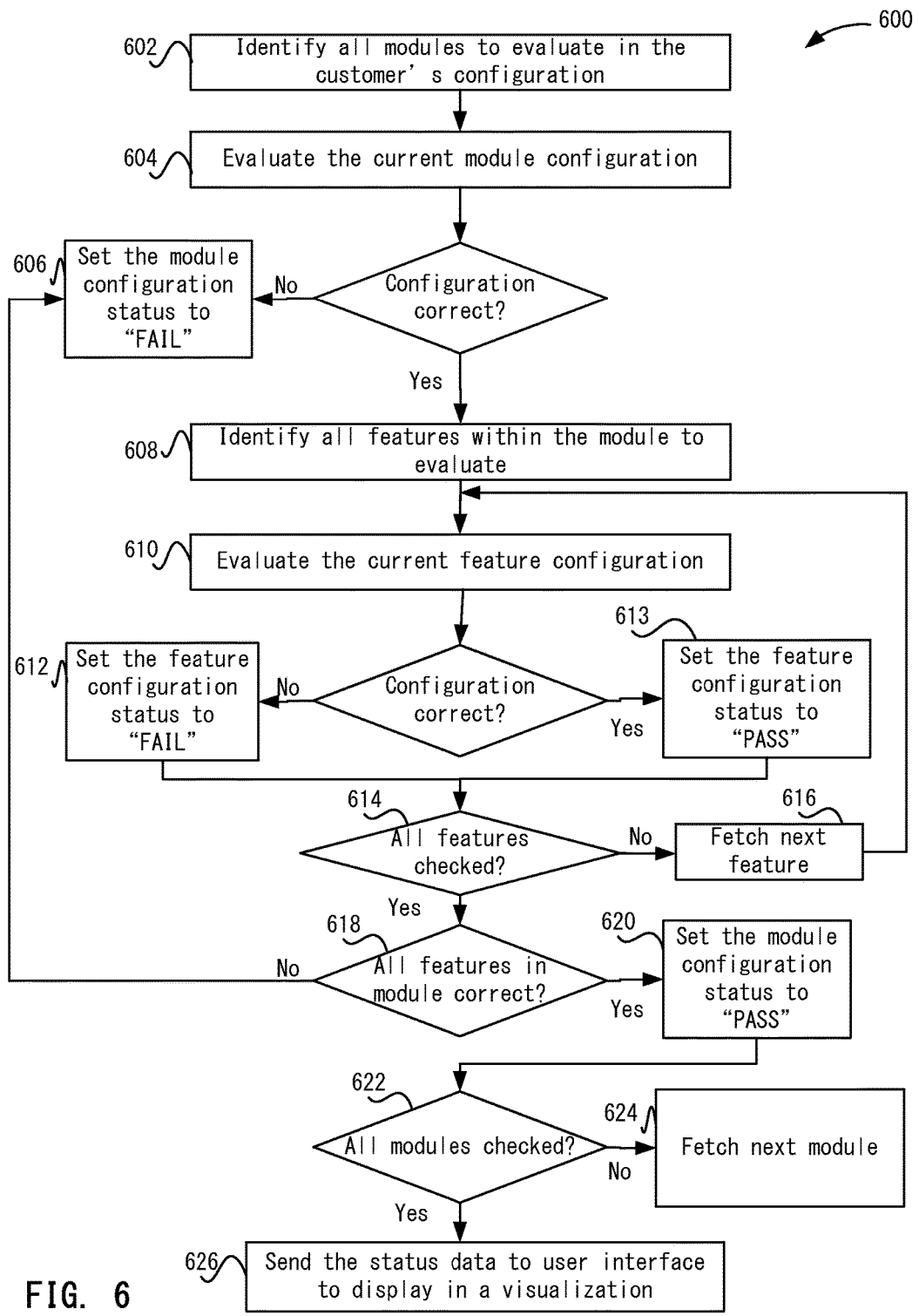
FIG. 6 depicts a simplified flowchart for evaluating the service requester's configuration in view of the developer's configuration according to one embodiment.

Once the modules and features are parsed in the developer's configuration, configuration dependency manager 102 can verify the service requester's configuration. FIG. 6 depicts a simplified flowchart 600 for processing the service requester's configuration according to one embodiment. At 602, configuration dependency manager 102 identifies all modules to evaluate in the service requester's configuration. For discussion purposes, the first module is processed first.

At 604, configuration dependency manager 102 evaluates the module configuration. Once determining the module, configuration dependency manager 102 uses the objects for a corresponding module in the developer's configuration to determine a configuration group reference for the module. Then, configuration dependency manager 102 checks the configuration references in the group. Configuration dependency manager 102 may fetch the configurations pertaining to the configuration references and evaluate each configuration. For example, configuration dependency manager 102 compares the developer's configuration with the service requester's configuration. The evaluation may include determining what information needs to be retrieved from the service requester configuration from the developer's configuration. For example, the pre-defined structured data format may have defined the place where the data is stored for the dependency and the dependency's expected value or behavior. Configuration dependency manager 102 retrieves this information in the service requester's configuration at runtime and compares the information with the expected value or behavior from the developer's configuration. These comparisons to perform may be defined in the developer's configuration. Also, configuration dependency manager 102 can access this information and perform the comparison because it is integrated into multi-tenant application product 106 and this check is performed during runtime. service requesterIf the service requester's configuration is set up per the developer's configuration, then the process continues at 608. However, if the service requester's configuration is not correct, at 606, configuration dependency manager 102 sets the module configuration status to "FAIL".

Assuming the module configuration passes, at 608, configuration dependency manager 102 identifies all features within the module to evaluate. This may begin processing at the first feature.

At 610, configuration dependency manager 102 evaluates the current feature configuration. This may check the status of each configuration reference obtained from the dependent configuration groups. For example, if a configuration group is set for a feature, the configurations in the group are retrieved and checked. In this case, a dependency for a feature in the developer's configuration is checked with the corresponding dependency in service requester's configuration. For example, configuration dependency manager 102 compares expected values for feature-related switches or runtime parameters of the service requester runtime configuration, checks the presence or absence of required data settings (such as links, email templates, feature-related data fields, etc.), validates user permissions, monitors the status of servers (such as uptime, sync issues, etc.). In a specific example, if one of the configuration dependencies requires an entry to be present in a particular database table, then configuration dependency manager 102 makes a query to this table (in the service requester's database instance) and checks to see if this entry exists or not. Configuration dependency manager 102 can also check the expected value for the entry. For a server health check, configuration dependency manager 102 may ping the server and monitoring the response, and in some cases such as search servers (which has a Master-Slave architecture), configuration dependency manager 102 also performs checks to identify whether the Slave is in sync with the Master. For configuration data stored in files, configuration dependency manager 102 accesses such files and reads the data in the files and compares the data with the developer configuration to check for correctness. If the feature configuration is not correct, at 612, configuration dependency manager 102 sets the feature configuration status as "FAIL". If the feature configuration passes, then at 613, configuration dependency manager 102 sets the feature configuration status as "PASS".

At 614, if the configuration check is not complete for all features, then at 616, configuration dependency manager 102 fetches the next feature and the process reiterates to 610. If all features have been checked, then at 618, configuration dependency manager 102 determines if all the features in the module are configured correctly. If not, then at 606, configuration dependency manager 102 sets the module configuration status to "FAIL".

If all the features were configured correctly, then at 620, configuration dependency manager 102 sets the module configuration status to "PASS".

The process then continues the check for other modules. For example, at 622, configuration dependency manager 102 determines if the configuration check is complete for all modules. If not, at 624, configuration dependency manager 102 fetches the next module and the process reiterates to 604.

If the configuration check is complete for all modules, then at 626, configuration dependency manager 102 sends the status data to user interface to display in a visualization.

Figure 7:
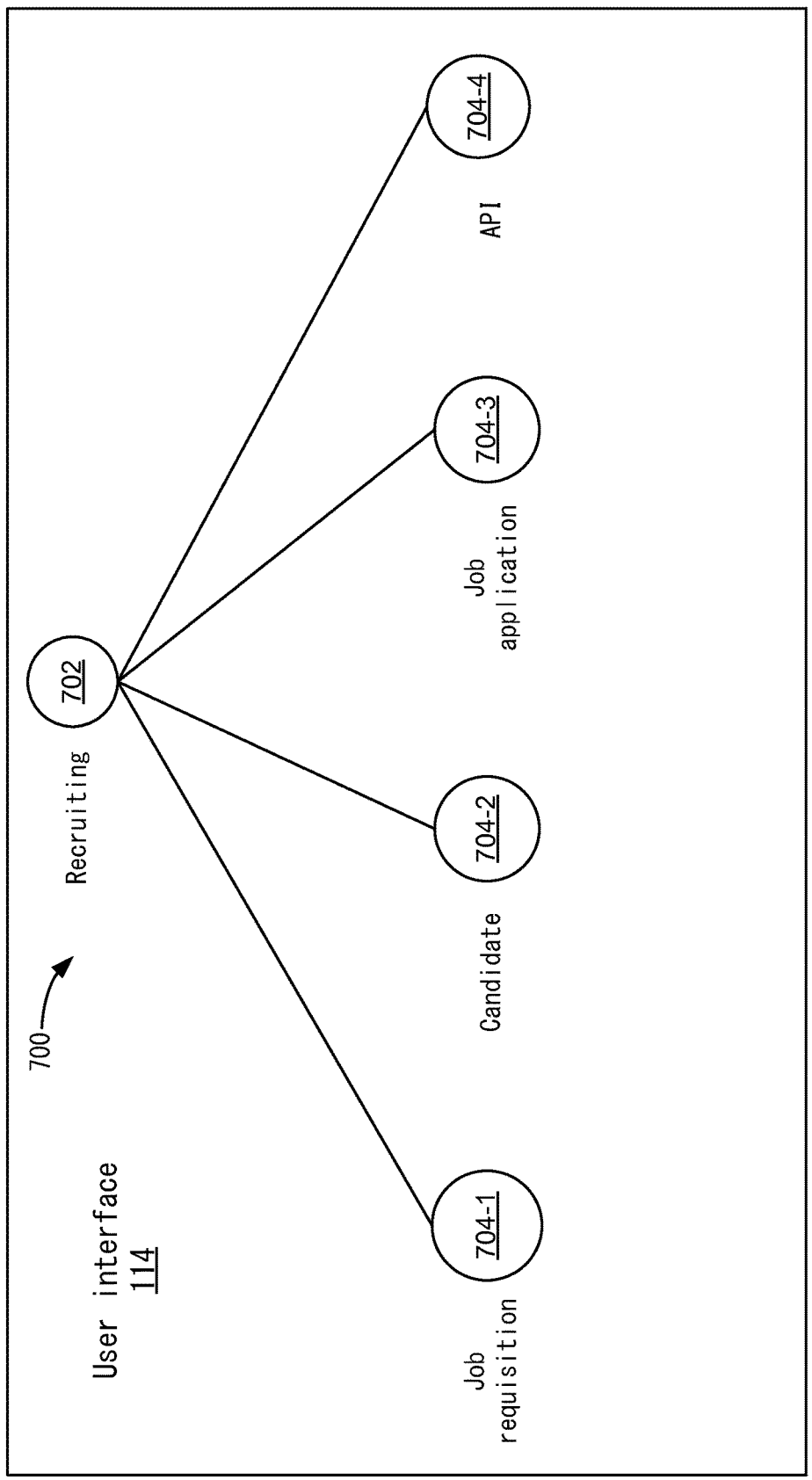
FIG. 7 depicts an example interface for a feature dependency visualization according to one embodiment.

The visualization will now be described in more detail. A service requester may use the configuration dependency manager via user interface 114. In one example, the user may open up a tool that includes the configuration dependency manager 102. FIG. 7 depicts an example interface for feature dependency visualization 206 according to one embodiment. In FIG. 7, the configuration dependency manager 102 may display a graph 700 including the configuration dependencies for a module. The relationships may be determined using the dependent feature checks. For example, in a hierarchical relationship, a child feature may specify a parent feature as one of its required configuration step. This would mean the child feature cannot be enabled or used unless the parent feature is enabled Graph 700 may be a tree structure, but other structures may be used. For example, at 702, a recruiting module is selected and its dependencies are shown. For example, the recruiting module may include the features of job requisition at 704-1, candidate at 704-2, job application at 704-3, and API at 704-4.

Figure 8:
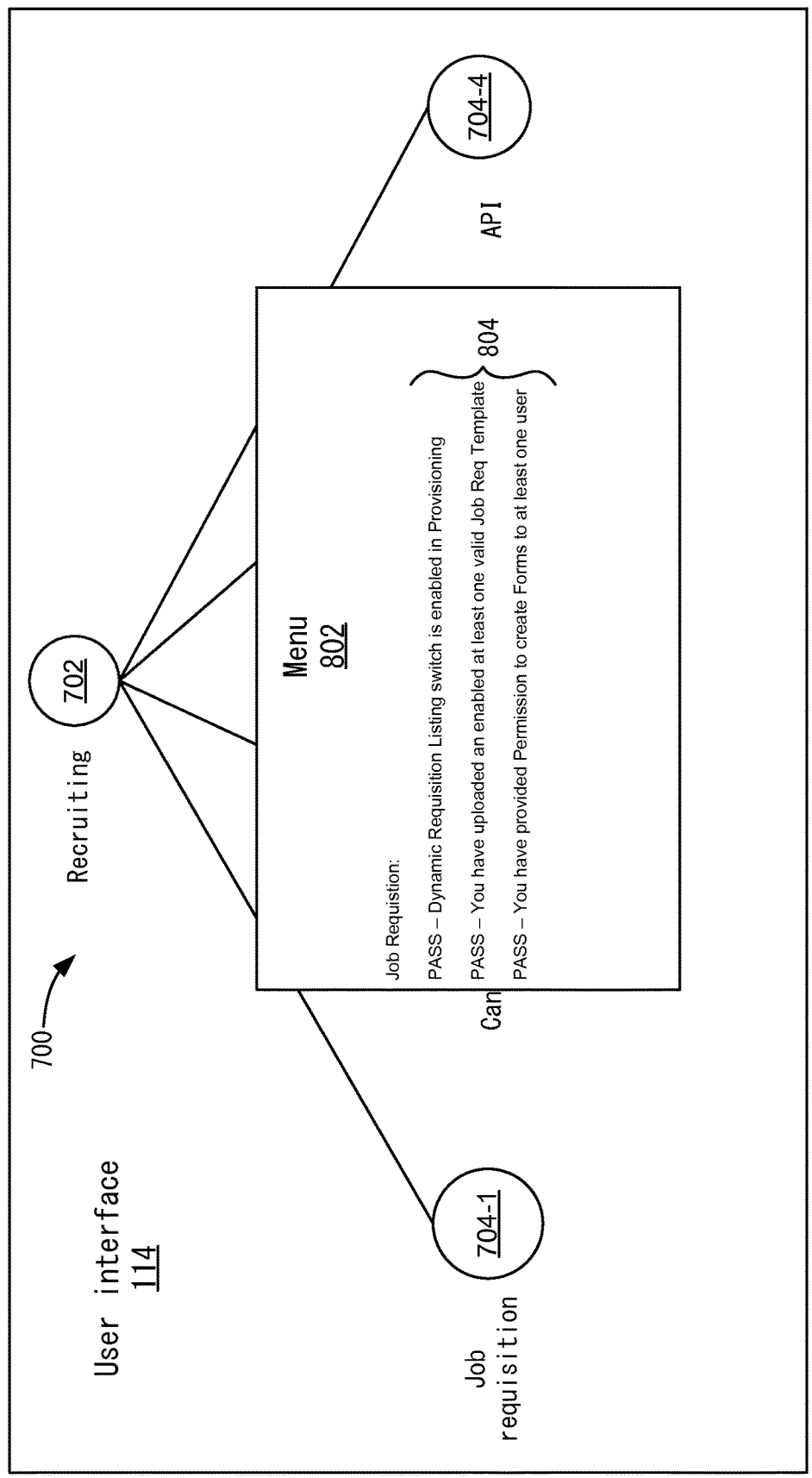
FIG. 8 shows an example of selecting a node according to one embodiment.

The detailed configuration can also be viewed by selecting a node in graph 700. FIG. 8 shows an example of selecting a node according to one embodiment. At 704-1, a user has selected the job requisition feature. This causes a menu 802 to be displayed that show the status of dependencies that are configured in the job requisition feature. For example, at 804, the statuses for certain dependencies of the feature are shown. This includes the dynamic requisition listing switch is enabled in provisioning correctly, at least one valid job requisition template has been uploaded and enabled correctly, and the permission to create forms for at least one user has been provided correctly. Thus, configuration dependency manager 102 has analyzed the dependencies for this feature and determined they have passed.

Figure 9:
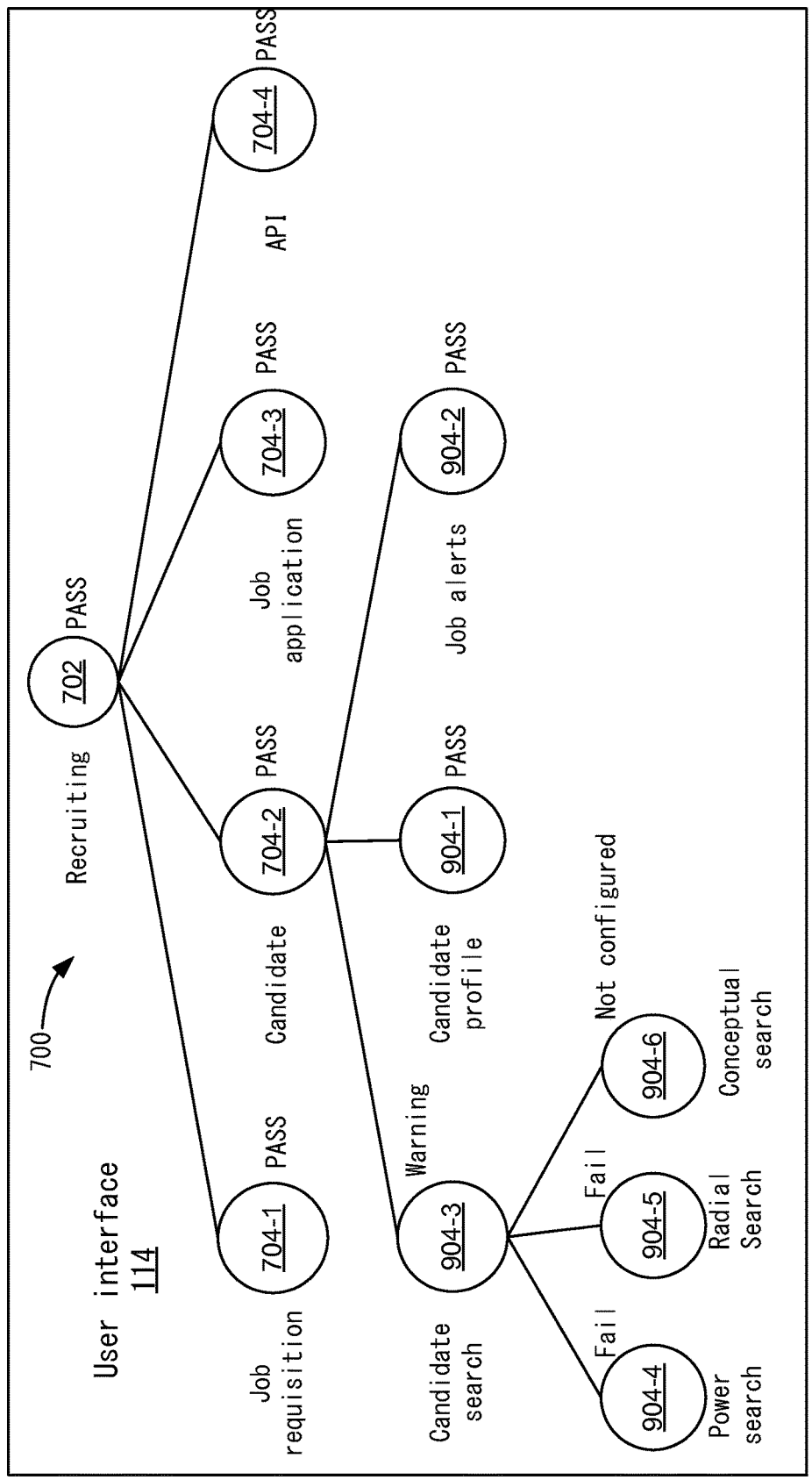
FIG. 9 depicts an example for drilling down into nodes according to one embodiment.

Further, a user can navigate through and drill down into certain nodes. FIG. 9 depicts an example for drilling down into nodes according to one embodiment. At 704-2, a user has selected the Candidate feature. Further nodes are now shown for the Candidate feature at 904-1-904-6. Also, the health of each node may be indicated visually. For example, different colors may be provided or other identifiers for the health of a node (for illustrative purposes, colors are not shown, but "PASS", "FAIL", "Warning", or "Not configured" are shown in the figure). In one example, the nodes shown at 904-1 and 904-2 have the status of "PASS" or are the color green. The candidate search feature at 904-3 may have a warning sign as a color orange, which may mean that some features below it may not be configured correctly. For example, at 904-4 and 904-5, the power search and the radial search features have not been configured correctly. At 904-6, the conceptual search feature has not yet been configured and is indicated with another color, such as gray. The user can now visually see the feature dependencies and also which features have not been configured correctly.

Figure 10:
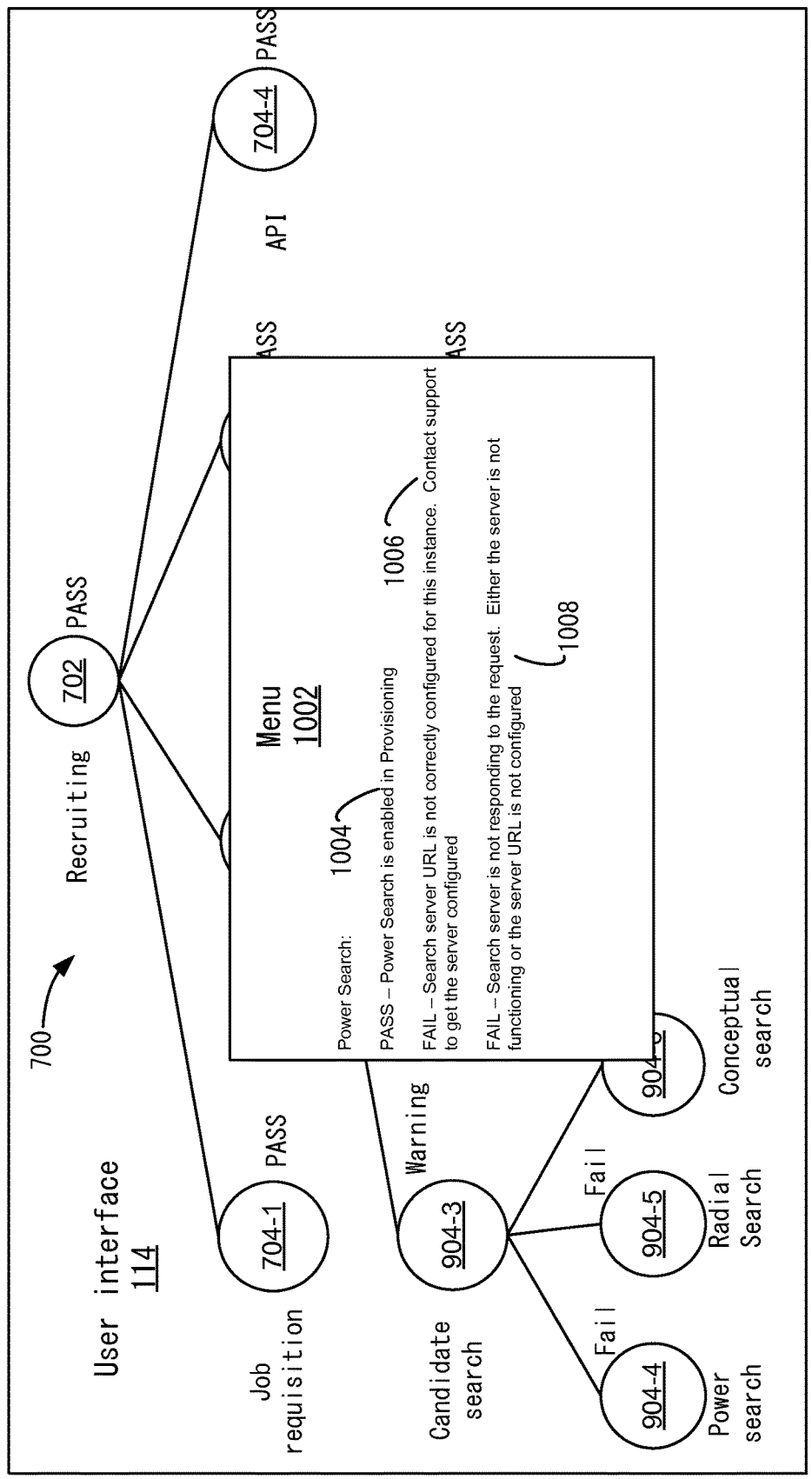
FIG. 10 depicts an example of selecting one of the nodes that has a failure according to one embodiment.

If the user would like to see details of the features that have not passed, the user may select one of these nodes. FIG. 10 depicts an example of selecting one of the nodes that has a failure according to one embodiment. At 904-4, the user has selected the power search feature. Configuration dependency manager 102 then outputs a menu 1002 that describes the dependencies of the feature. Menu 1002 may show success or failure messages that were determined by configuration dependency manager 102 when comparing the service requester configuration with the developer configuration. For example, at 1004, configuration dependency manager 102 indicates that the power search is enabled and is provisioning successfully. However, at 1006, configuration dependency manager 102 indicates that the search server URL is not correctly configured for this instance and also at 1008 that the search server is not responding to a request because the server is not functioning or the URL is not configured. Configuration dependency manager 102 may have determined these failure messages based on the analyzing of the service requester configuration and the developer configuration of the dependencies. A search server URL may be based on the network dependencies or runtime option dependencies. These failure messages give a possible reason for the failure as well as a suggested solution.

Figure 11:
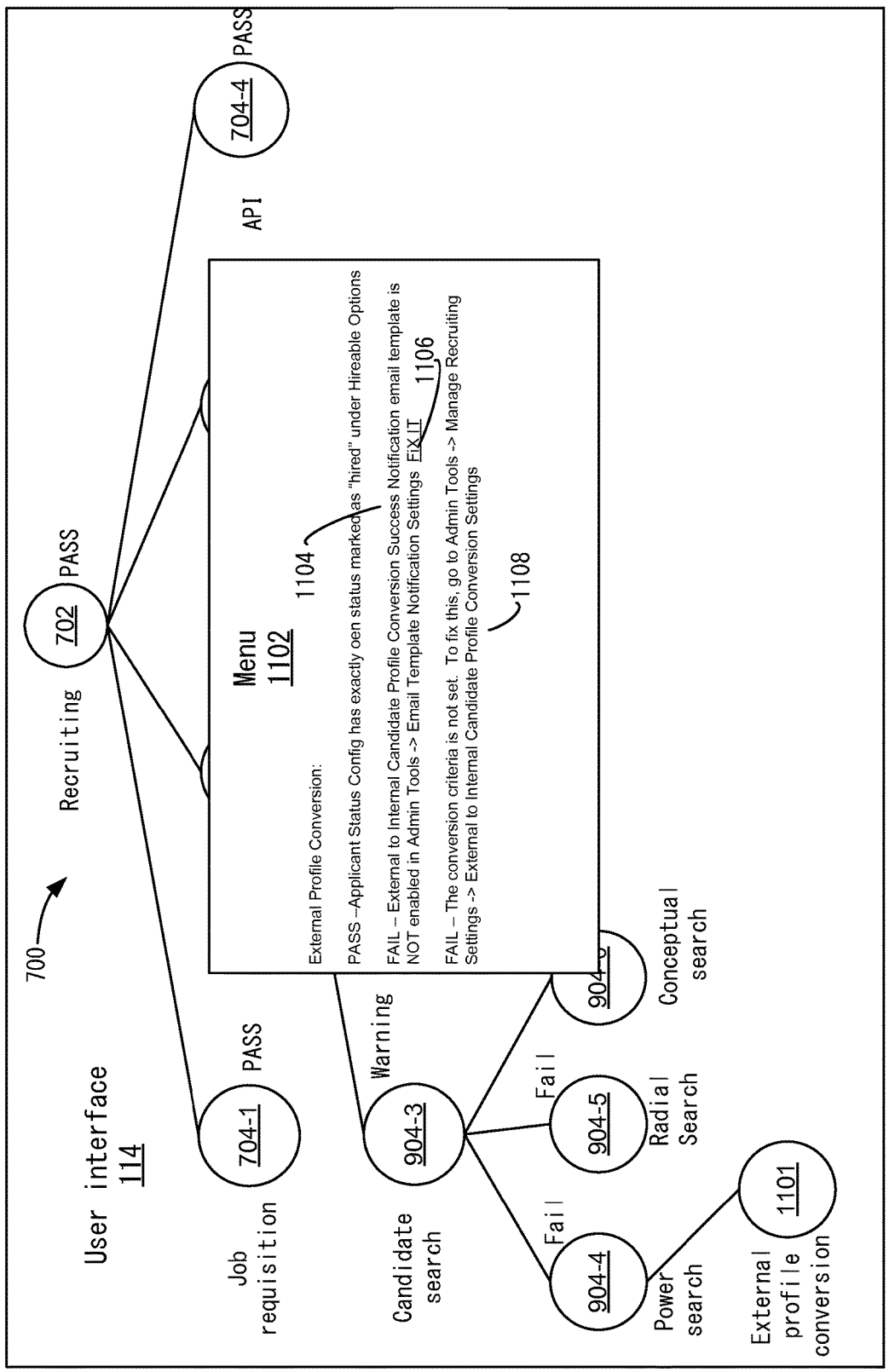
FIG. 11 depicts an example of an interface showing options to fix the configuration according to one embodiment.

The service requester may be able to fix the configuration directly from a menu in configuration dependency manager interface or directions may be provided. FIG. 11 depicts an example of an interface showing options to fix the configuration according to one embodiment. At 1102, a menu showing the feature configuration status is shown for an External profile conversion feature at 1101. At 1104, a feature for the external to internal candidate profile conversion success notification e-mail template not being enabled in the admin tools is shown. At 1106, a "FIX IT" link is provided to allow the user to directly open an interface to fix this configuration. When the user selects the FIX IT link, and then the service requester may directly fix feature from this interface.

At 1108, a feature indicating that the conversion criteria is not set is provided. At 1110, directions to fix this feature may be provided, which indicates that the user should go to the link shown to fix the configuration. This information may be derived from the developer's configuration.

Once a user fixes the configuration for a feature, configuration dependency manager 102 may check the configuration with the developer's configuration. If the configuration passes, then configuration dependency manager 102 may change the node to indicate the feature passes, such as by changing the node from the color red to the color green.

Although this tree structure was described, other structures may be used to provide the feature status. For example, configuration dependency manager 102 may provide a list of features that have a status of "FAIL" and allow a user to select the features to view the status.

Accordingly, configuration dependency manager 102 allows service requesters to configure features in a multitenant application product 106 with their customization. Configuration dependency manager 102 leverages the developer's configuration that is provided in a pre-defined format. This allows configuration dependency manager 102 to confirm the service requester configuration.

FIG. 12 illustrates hardware of a special purpose computing machine configured with configuration dependency manager 102 according to one embodiment. An example computer system 1210 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable storage mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information through the network interface 1204 across a local network 1220, an Intranet, or the Internet 1230. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
during runtime use of a configurable application that is used by multiple service requesters, using, by a computing device, a configuration dependency manager integrated in the configurable application to check a set of features for one of the service requesters by performing:
receiving, by the configuration dependency manager, a service requester configuration for the set of features of the configurable application, the service requester configuration being set by the service requester;
determining, by the configuration dependency manager, a set of dependencies for the set of features that have been configured by the service requester configuration;
determining, by the configuration dependency manager, a developer's configuration for a plurality of features for the configurable application, the developer's configuration including dependencies for each of the plurality of features in a pre-defined format;
analyzing, by the configuration dependency manager, the set of dependencies with corresponding dependencies in the developer's configuration to determine when an issue exists with the service requester configuration; and
providing, by the configuration dependency manager, a visualization of the set of features based on the analyzing the set of dependencies, wherein the issue is shown on the visualization.

2. The method of claim 1, wherein analyzing comprises:
parsing the service requester configuration to determine a module that includes the set of features.

3. The method of claim 2, further comprising:
determining a module configuration for the module in the service requester configuration; and
analyzing the module configuration with a corresponding module configuration in the developer's configuration to determine when an issue exists with the module configuration.

4. The method of claim 3, further comprising:
determining the set of features in the module configuration.

5. The method of claim 3, wherein the module configuration includes a configuration group the module configuration depends on, the set of features for the module, and a configuration group each feature depends on.

6. The method of claim 1, wherein analyzing the set of dependencies comprises:
determining a configuration group for a feature in the set of features; and
determining a set of configuration references in the configuration group that correspond to dependencies in the set of dependencies.

7. The method of claim 1, further comprising:
parsing the developer's configuration to determine dependencies for the set of features in the developer's configuration; and
using information from the developer's configuration to determine how to retrieve values for the set of the features during runtime.

8. The method of claim 1, further comprising:
parsing the developer's configuration to determine the corresponding dependencies for the set of features in the developer's configuration; and
using information from the developer's configuration to determine how to access the set of the features in the service requester configuration during runtime.

9. The method of claim 1, wherein outputting the visualization comprises:
outputting a menu indicating information for the issue based on the analyzing.

10. The method of claim 9, wherein the information indicates whether a feature passed or failed.

11. The method of claim 10, wherein when the information indicates the feature failed, the menu indicates a possible solution for the issue based on the developer's configuration.

12. The method of claim 11, wherein the possible solution includes a link to automatically fix the issue.

13. The method of claim 1, wherein outputting the visualization comprises:
outputting a relationship between the set of features based on the developer's configuration.

14. The method of claim 1, wherein the developer's configuration is received before use of the set of features by the service requester in the configurable application.

15. The method of claim 1, wherein the configurable application is a multi-tenant application that is used and configured differently by the multiple service requesters.

16. A non-transitory computer-readable storage medium containing instructions, that when executed, control a computer system to be configured for:
during runtime use of a configurable application that is used by multiple service requesters, using a configuration dependency manager integrated in the configurable application to check a set of features for one of the service requesters by performing:
receiving, by the configuration dependency manager, a service requester configuration for the set of features of the configurable application, the service requester configuration being set by the service requester;
determining, by the configuration dependency manager, a set of dependencies for the set of features that have been configured by the service requester configuration;
determining, by the configuration dependency manager, a developer's configuration for a plurality of features for the configurable application, the developer's configuration including dependencies for each of the plurality of features in a pre-defined format;
analyzing, by the configuration dependency manager, the set of dependencies with corresponding dependencies in the developer's configuration to determine when an issue exists with the service requester configuration; and
providing, by the configuration dependency manager, a visualization of the set of features based on the analyzing the set of dependencies, wherein the issue is shown on the visualization.

17. The non-transitory computer-readable storage medium of claim 16, wherein analyzing the set of dependencies comprises:
determining a configuration group for a feature in the set of features; and
determining a set of configuration references in the configuration group that correspond to dependencies in the set of dependencies.

18. The non-transitory computer-readable storage medium of claim 16, wherein outputting the visualization comprises:
outputting a menu indicating information for the issue based on the analyzing.

19. The non-transitory computer-readable storage medium of claim 18, wherein when the information indicates the feature failed, the menu indicates a possible solution for the issue based on the developer's configuration.

20. An apparatus comprising:
one or more computer processors; and
a non-transitory computer-readable storage medium comprising instructions, that when executed, control the one or more computer processors to be configured for:
during runtime use of a configurable application that is used by multiple service requesters, using a configuration dependency manager integrated in the configurable application to check a set of features for one of the service requesters by performing:
receiving, by the configuration dependency manager, a service requester configuration for the set of features of the configurable application, the service requester configuration being set by the service requester;
determining, by the configuration dependency manager, a set of dependencies for the set of features that have been configured by the service requester configuration;
determining, by the configuration dependency manager, a developer's configuration for a plurality of features for the configurable application, the developer's configuration including dependencies for each of the plurality of features in a pre-defined format;
analyzing, by the configuration dependency manager, the set of dependencies with corresponding dependencies in the developer's configuration to determine when an issue exists with the service requester configuration; and
providing, by the configuration dependency manager, a visualization of the set of features based on the analyzing the set of dependencies, wherein the issue is shown on the visualization.

* * * * *